(12) United States Patent
Exner et al.

(10) Patent No.: US 11,782,398 B2
(45) Date of Patent: Oct. 10, 2023

(54) OPERATING A PORTABLE ELECTRONIC DEVICE TO DETECT AIRPLANE FLIGHT EVENTS

(71) Applicant: Sony Group Corporation, Tokyo (JP)

(72) Inventors: Peter Exner, Bjärred (SE); Hannes Bergkvist, Rydebäck (SE); Mattias Falk, Lund (SE); Thomas Fänge, Södra Sandby (SE)

(73) Assignee: SONY GROUP CORPORATION, Tokyo (JP)

( * ) Notice: Subject to any disclaimer, the term of this patent is extended or adjusted under 35 U.S.C. 154(b) by 184 days.

(21) Appl. No.: 17/540,084

(22) Filed: Dec. 1, 2021

(65) Prior Publication Data
US 2022/0229402 A1   Jul. 21, 2022

(30) Foreign Application Priority Data
Jan. 15, 2021 (SE) .................................. 2150040-0

(51) Int. Cl.
*G05B 13/04* (2006.01)
*G01D 21/02* (2006.01)
(Continued)

(52) U.S. Cl.
CPC ............. *G05B 13/04* (2013.01); *G01D 21/02* (2013.01); *G05B 13/0265* (2013.01); *H04R 1/08* (2013.01); *H04M 1/72463* (2021.01)

(58) Field of Classification Search
CPC ............... G05B 13/04; G05B 13/0265; H04M 1/72463; G01D 21/02; H04R 1/08
(Continued)

(56) References Cited

U.S. PATENT DOCUMENTS 6,928,300 B1 * 8/2005 Skinner ................ G06Q 10/109
                                                          455/418
10,530,920 B1 * 1/2020 Jain .................. H04W 52/0274
                        (Continued)

FOREIGN PATENT DOCUMENTS

CN      103888591 A  *  6/2014
TW      201436607 A  *  9/2014
                 (Continued)

OTHER PUBLICATIONS

Office Action and Search Report from corresponding Swedish Application No. 2150040-0, dated Sep. 28, 2021, 8 pages.

*Primary Examiner* — Ronald D Hartman, Jr.
(74) *Attorney, Agent, or Firm* — TUCKER ELLIS LLP

(57) ABSTRACT

A portable electronic device is controlled, for example to selectively activate a flight mode, based on first event data and/or second event data. The first event data is generated by operating a first model for detection of airplane flight events, AFEs, on first sensing data representing ambient pressure. The second event data is generated by operating a second model for detection of AFEs on second sensing data representing own motion or ambient sound. A control method in the portable electronic device generates training data comprising groups of time-aligned data samples from the first event data and the second sensing data, generates an updated second model by use of the training data, and replaces the second model by the updated second model. The control method facilitates adaptation of the portable electronic device to detect airplane flight events in new environments and enables improved robustness when detecting AFEs.

10 Claims, 4 Drawing Sheets

(51) Int. Cl.
  *G05B 13/02*     (2006.01)
  *H04R 1/08*      (2006.01)
  *H04M 1/72463*   (2021.01)

(58) Field of Classification Search
  USPC .......................................................... 700/29
  See application file for complete search history.

(56) References Cited

U.S. PATENT DOCUMENTS

| | | |
|---|---|---|
| 10,728,379 B1 | 7/2020 | Gupta |
| 2006/0178108 A1* | 8/2006 | Chotoku ................ H04M 1/66 |
| | | 455/26.1 |
| 2010/0167691 A1* | 7/2010 | Howarter .......... H04M 1/72463 |
| | | 455/410 |
| 2010/0167714 A1* | 7/2010 | Howarter .......... H04M 1/72463 |
| | | 455/418 |
| 2010/0167716 A1* | 7/2010 | Howarter ............. H04W 8/245 |
| | | 455/419 |
| 2010/0267375 A1* | 10/2010 | Lemmon ................ G06F 21/74 |
| | | 455/418 |
| 2011/0047112 A1* | 2/2011 | Ketabdar ................ G06N 3/02 |
| | | 706/20 |
| 2013/0012181 A1* | 1/2013 | Jeon ...................... H04W 4/027 |
| | | 455/418 |
| 2013/0035063 A1* | 2/2013 | Fisk ...................... H04W 4/029 |
| | | 455/410 |
| 2014/0308940 A1 | 10/2014 | Kwon |
| 2018/0338003 A1 | 11/2018 | Carlson |
| 2019/0220697 A1 | 7/2019 | Kiemele |
| 2020/0213830 A1* | 7/2020 | Zhao ..................... H04W 76/14 |

FOREIGN PATENT DOCUMENTS

| | | | |
|---|---|---|---|
| WO | WO-9722049 A1 * | 6/1997 | .......... G06F 1/1616 |
| WO | WO-0175472 A2 * | 10/2001 | .......... G01S 5/0018 |
| WO | 2005109155 A1 | 11/2005 | |
| WO | WO-2010121150 A1 * | 10/2010 | ............. G06F 21/74 |
| WO | WO-2013044399 A1 * | 4/2013 | ........ H04M 1/72577 |
| WO | WO-2020002709 A1 * | 1/2020 | ......... H04B 7/18502 |
| WO | 2020176107 A1 | 9/2020 | |

* cited by examiner

OPERATING A PORTABLE ELECTRONIC DEVICE TO DETECT AIRPLANE FLIGHT EVENTS

RELATED APPLICATION DATA

This application claims the benefit of Swedish Patent Application No. 2150040-0, filed Jan. 15, 2021, the disclosure of which is incorporated herein by reference in its entirety.

TECHNICAL FIELD

The present disclosure relates to functions in portable electronic devices and, in particular, techniques for operating a portable electronic device to detect airplane flight events based on sensor data.

BACKGROUND

Airlines generally prohibit the use of equipment that transmits radio-frequency (RF) signals, such as cellular transmission signals, at least during takeoff and landing to avoid interference with flight navigation systems. It has been proposed to provide portable electronic devices with an autonomous function that automatically activates/deactivates RF signal transmission capabilities upon detection of specific airplane flight events such as takeoff or landing. This function may be used in portable electronic devices that are attached or otherwise associated with cargo and configured to transmit position data for tracking the cargo in transit.

US2011/0047112 proposes a GSM device that classifies airplane flight events, such as takeoff, based on an acceleration pattern represented by features extracted from an output signal of one or more acceleration sensors. The classification is made by operating a statistical model such as an artificial neural network on the acceleration pattern.

To deploy such a GSM device, the statistical model needs to be trained to detect relevant airplane flight events with sufficient reliability, and possibly also to discriminate between airplane flight events and events for other transportation modes. The training requires access to large volumes of training data that associates various acceleration patterns with airplane flight events for a multitude of environments, such as different airplanes, different placements within airplanes, etc., and possibly with events for other transportation modes. Training data is generated by so-called data annotation. In this case, acceleration patterns would have to be manually categorized and labeled with a respective event. This involves huge manual effort. Further, if the statistical model is to be improved, for example to operate in a new environment, new training data needs to be generated, again involving significant manual effort.

The foregoing drawbacks are applicable to detection of airplane flight events, which may be used for any type of control of a portable electronic device, by use of any type of model that needs to be trained, or otherwise prepared or adapted based on training data.

SUMMARY

It is an objective to at least partly overcome one or more limitations of the prior art.

A further objective is to facilitate deployment of a portable electronic device which is configured to detect airplane flight events based on sensor data.

Another objective is to facilitate adaptation of the portable electronic device to detect airplane flight events in new environments.

Yet another objective is to provide a robust technique of detecting airplane flight events.

One or more of these objectives, as well as further objectives that may appear from the description below, are at least partly achieved by a method of controlling a portable electronic device, a computer-readable medium, and a portable electronic device according to the independent claim, embodiments thereof being defined by the dependent claims.

A first aspect of the present disclosure is a method of controlling a portable electronic device comprising a first module for sensing ambient pressure, and a second module for sensing own motion or ambient sound. The method comprises the steps of: obtaining first sensing data based on output from the first module; obtaining second sensing data based on output from the second module; generating first event data by operating, on the first sensing data, a first model configured to detect a first set of airplane flight events; generating second event data by operating, on the second sensing data, a second model configured to detect a second set of airplane flight events; and controlling the portable electronic device based on the first event data and/or the second event data. The method further comprises: generating training data comprising groups of time-aligned data samples from the first event data and the second sensing data; generating an updated second model by use of the training data; and replacing the second model by the updated second model.

A second aspect is a computer-readable medium comprising instructions which, when installed on a processing system, causes the processing system to perform the method of the first aspect.

A third aspect is a portable electronic device comprising a first module for sensing ambient pressure, and a second module for sensing own motion or ambient sound, and further comprising logic configured to perform the method of the first aspect.

These aspects are based on the notion that the first model, by operating on first sensing data that is based on and thereby represents ambient pressure, is capable of detecting airplane flight events with high reliability. This allows the first event data to be used for labeling of second sensing data, which is used as input for the second model. Accordingly, by the foregoing aspects, it is possible to generate training data for the second model in a self-supervised or distantly supervised fashion. This allows for the training data to be generated during use of the portable electronic device, making training data available for a multitude of different environments, locations, usage scenarios, etc. The improved availability of training data will facilitate adaptation of the portable electronic device, by training of the second model, to detect airplane flight events in new environments and improve robustness.

Still other objectives, aspects, and technical effects, as well as features and embodiments will appear from the following detailed description, the attached claims and the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Figure 1A:
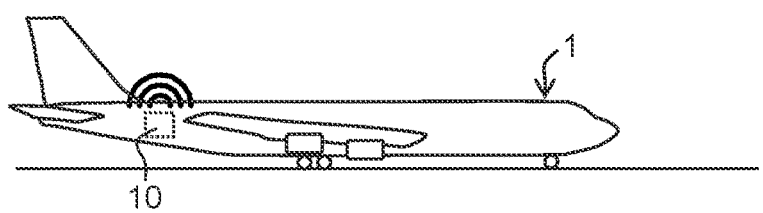
FIGS. 1A-1C illustrate a portable electronic device in an airplane before start, during takeoff and during flight.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the terms "multiple", "plural" and "plurality" are intended to imply provision of two or more elements, whereas the term "set" is intended to imply a provision of one or more elements. The term "and/or" includes any and all combinations of one or more of the associated listed elements.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

As used herein, "model" refers to a mathematical structure which is configured or configurable to describe or represent the operation of a system. The mathematical structure may, but need not, be a mathematical model that describes the system in terms of variables and operators, such as algebraic operators, functions, differential operators, etc., the variables comprising quantifiable system parameters.

As used herein, "rule-based model" refers to a model that uses a set of rules that indirectly specifies a mathematical model. A rule-based model may use heuristics, for example defined based on empirical observations, rule of thumb, or trial-and-error, to generate output based on input.

As used herein, "data-driven model" refers to a model which is operable to find relationships between input and output without explicit knowledge about the physical behavior of the system. A data-driven model may include statistical analysis, machine learning or deep learning.

As used herein, "training" refers to a process of configuring or adapting a model to describe or represent a system. The process of training uses "training data", which comprises a plurality of corresponding samples of input to the system and output of the system. In the context of data-driven models, training is used to find the relationships between input and output.

As used herein, "flight mode" refers to an operational mode of a portable electronic device that, when activated, suspends at least a subset of the radio-frequency (RF) signal transmission capability of the portable electronic device, such as one or more cellular communication capabilities, one or more short-range wireless communication capabilities, etc. Flight mode is also known as airplane mode, aeroplane mode, offline mode, or standalone mode.

As used herein, "airplane flight event" (abbreviated AFE) refers to any identifiable phase of an airplane before, during or after flight. Examples of AFEs include, in sequence for a flight: pre-departure, taxiing, takeoff, initial climb, climb to cruise altitude, cruise altitude, descent, approach, landing, taxiing to terminal, and post-flight. One or more of the phases during flight, between take-off and landing, are also referred to as "inflight" herein. Pre-departure involves preparing for flight, boarding passengers, and loading goods onto the airplane. Taxiing involves maneuvering the airplane to the runway. Takeoff involves accelerating the airplane to flying speed, becoming airborne, and retracting the landing gear. Initial climb involves reducing from takeoff power to a lesser thrust for a climb when a safe altitude is deemed to have been reached. Climb to cruise altitude involves attaining smooth flight and turning off seatbelt signs. Cruise altitude involves flying the airplane at a designated altitude. Descent involves decreasing the altitude from the designated cruise altitude to initial approach altitude. Approach involves configuring the airplane for landing, for example decreasing speed, extending flaps and slats on the wings to create more lift, extending the landing gear, etc. Landing involves slowing down to landing speed, engaging the landing gear with the runway, applying wheel brakes, and activating reverse engine thrust. Taxiing to terminal involves maneuvering from the runway to the terminal via taxiways to a designated arrival bay. Post-flight involves passengers leaving the airplane, goods being unloaded, crews being switched, etc.

At least some embodiments disclosed herein are based on the insight that a portable electronic device that includes at least two models (first and second models) for detecting AFEs may be configured to use the output of a first model to generate training data for the second model, thereby configuring and/or improving the second model to detect AFEs. The training data may thereby be generated in self-supervised or distantly supervised fashion. This approach will automatically provide access to large volumes of training data in a multitude of different environments, locations, usage scenarios, etc., and reduce the need for manual work to a minimum. The approach may be particularly useful when the first model is more reliable or robust, or easier to configure for detection of relevant AFEs, compared to the second model, since the output data from the first model is trusted and used to generate training data for the second model.

Figure 1B:
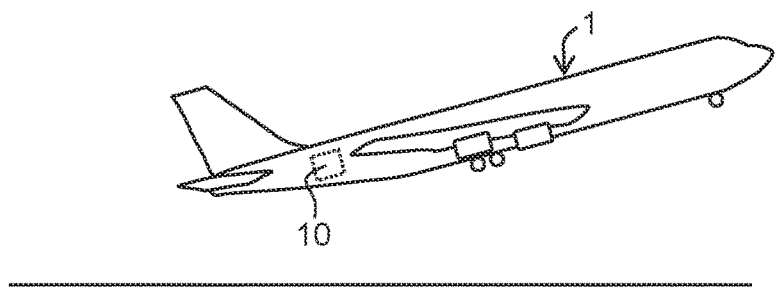
Figure 1C:
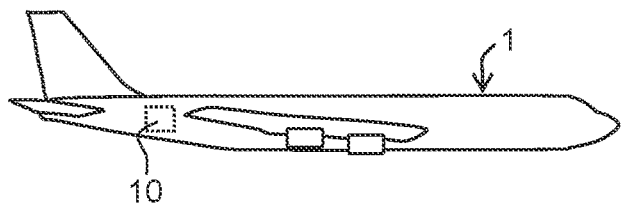

FIGS. 1A-1C illustrate a use case of a portable electronic device in accordance with some embodiments. FIG. 1A shows an airplane 1 at an airport before takeoff, for example while taxiing towards a runway. A portable electronic device 10, abbreviated PED in the following, is located inside the airplane 1 and operates to intermittently transmit RF signals, as indicated by a transmission symbol. In one example, the PED 10 is a cargo-tracking device, also known as logistics tracker, which is attached to or otherwise combined with goods in transport and configured to transmit its position, optionally together with further measured data such as temperature, pressure, moisture etc., by the RF signals.

As noted in the Background section, regulations prohibit the use of equipment that transmits RF signals during AFEs such as takeoff and landing to avoid interference with flight navigation systems. Cargo-tracking devices are autonomous devices and therefore configured to detect AFEs and automatically enter flight mode upon detection of one or more specific AFEs. Further, it may be desirable to keep cargo-tracking devices in flight mode during inflight, to conserve battery power. FIG. 1B shows the airplane 1 during takeoff from the runway, with the PED 10 being set in flight mode to thereby refrain from transmitting RF signals. FIG. 1C shows the airplane at cruise altitude, with the PED 10 being kept in flight mode.

FIGS. 1A-1C are also applicable to a use case in which the PED 10 is a smartphone or other electronic equipment carried by a passenger onto the airplane 1. Such a PED 10 may transmit the RF signals as a result of the passenger using the PED 10 for accessing the Internet or placing a phone call. To comply with the above-mentioned regulations, passengers are requested by airplane staff to turn off all electronic equipment during takeoff and landing. To mitigate the risk that this request is overlooked or ignored by passengers, it is envisioned that future smartphones and other electronic equipment may be provided with an automated function similar to the one in cardo-tracking devices.

As noted above, the PED 10 may comprise two or more models that operate on sensing data, which is obtained from a sensor system in the PED 10, to ensure safe activation of the flight mode. Optionally, the models may be independent, which implies that each model is operable to autonomously detect an airplane flight event. Optionally, the models may operate on different types of sensing data. Optionally, the models may operate on sensing data that is generated by different, and thus independent, sensors in the sensor system of the PED 10.

With respect to cargo-tracking devices, regulatory authorities may require these devices to be configured for automated radio suspension in flight by use of so-called multiple modes of redundancy. For example, EASA (European Union Aviation Safety Agency) stipulates that a cargo-tracking device should be designed with a minimum of two independent models to turn it off completely, turn off the cellular or mobile functions, or a combination of both when airborne. These models should use independent sources to identify that the airplane is in flight, where redundant sources of the same information are not considered independent. The EASA regulations further stipulate that a conservative architecture should be used, which means that flight mode should be activated if any one of the models detects that the airplane is in flight (logic OR gate). Further, it is stipulated that the flight mode should not be deactivated unless all models identify that the aircraft is on ground (logic AND gate).

In the following detailed examples, it is assumed that the PED 10 is configured to fulfil these conditions. It should be noted, though, that the disclosure is not limited to these examples. Generally, any two models, using any type of sensor data from any type(s) of sensor(s), may be used for detecting any number and type of AFEs, and any type of logic gate function(s) may be applied to decide if to activate or deactivate the flight mode based on detected AFEs.

Figure 2:
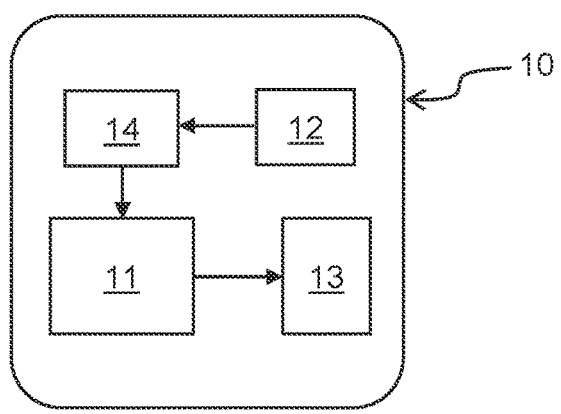
FIG. 2 is a block diagram of an example portable electronic device.

FIG. 2 is a schematic view of an example PED 10 in accordance with some embodiments. The PED 10 comprises a controller or control unit 11, which is configured to control the overall operation of the PED 10. The PED 10 further comprises a sensor arrangement or sensor system 12 which is configured to generate sensor data that may be processed, stored or transmitted by the PED 10. A wireless communication system 13 provides the PED 10 with RF transmission capability. The wireless communication system 13 may be configured for any type of RF transmission, including but not limited to cellular communication under various modes or protocols, such as voice calls, SMS, EMS, or MMS messaging, CDMA, TDMA, PDC, WCDMA, CDMA2000, GPRS, WiMAX, LTE, 5G NR, etc. Additionally or alternatively, the RF transmission may include any type of short-range communication, such as Bluetooth, BLE, WiFi, LR-WPAN, UWB, etc. The PED 10 further includes an event detection system 14, which is configured to detect and signal AFEs. In the illustrated example, as indicated by arrows, the detection system 14 may obtain sensor data from the sensor system 12 and process the sensor data for detection of AFEs. Upon detection of a specific AFE, the detection system 14 may output a signal that causes the PED 10 to enter a flight mode by the controller 11 suspending, deactivating or otherwise disabling the RF transmission capability of the wireless communication system 13. FIG. 2 is merely an example. In other embodiments, the detection system 14 may receive the sensor data via the controller 11, and/or the detection system 14 may be integrated with the controller 11.

The PED 10 in FIG. 2 may be any type of electronic device configured for wireless communication, such as a cargo-tracking device, a mobile phone, a smart phone, a personal digital assistant (PDA), a tablet computer, a laptop computer, an IoT (Internet-of-Things) device, a wearable computer, etc.

Figure 3:
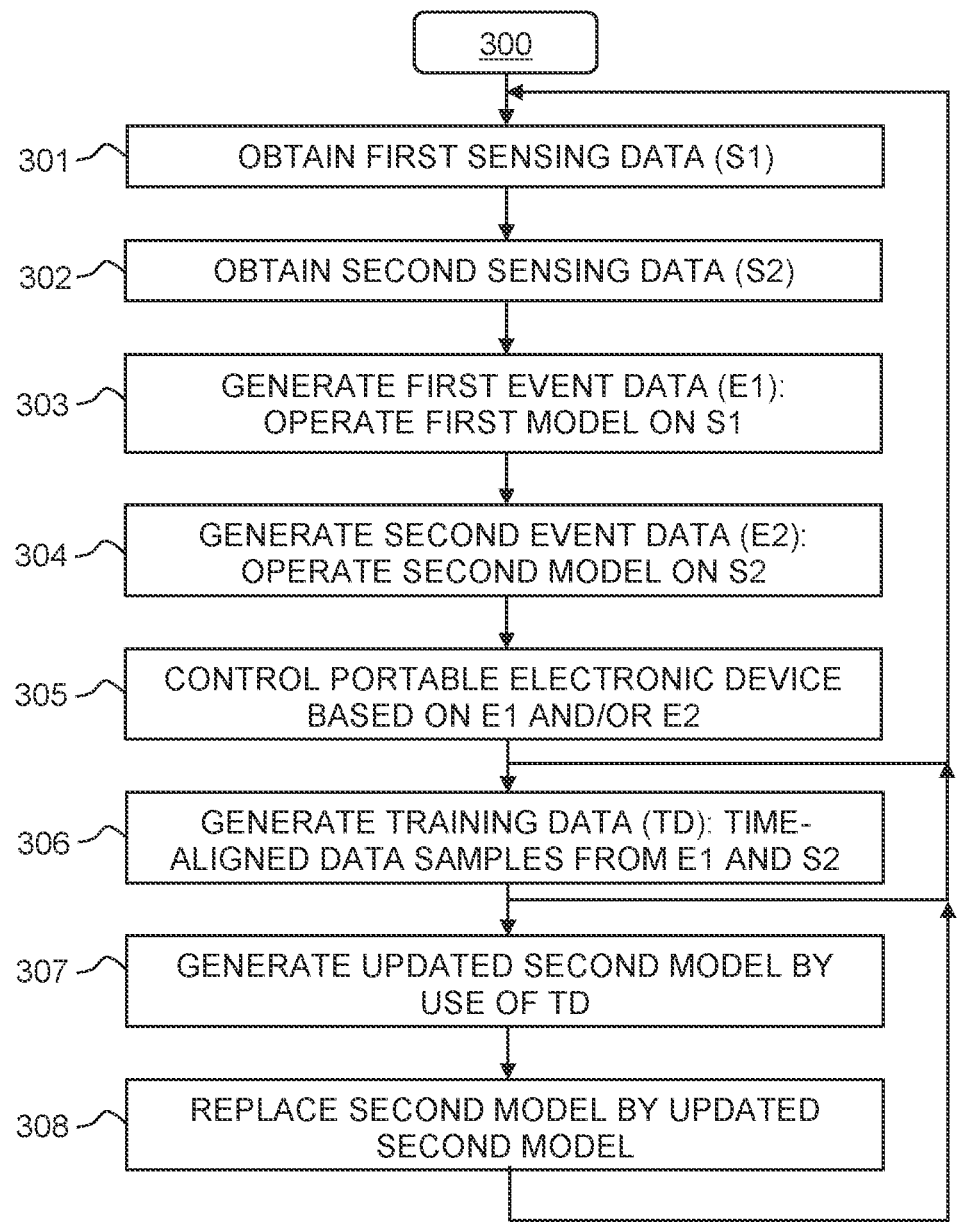
FIG. 3 is a flowchart of an example method of controlling a portable electronic device.

FIG. 3 is an example control method 300 that may be performed by the PED 100 in FIG. 2, for example by the detection system 14 in combination with the controller 11. The method 300 presumes that the sensor system 12 comprises a first module for sensing ambient pressure, and a second module for sensing own motion or ambient sound. In some embodiments, the first module comprises or is connected to a pressure sensor. The pressure sensor may be of any type and may measure ambient pressure (absolute or relative) inside the PED 10 or in the surroundings of the PED 10. In some embodiments, the second module comprises or is connected to one or more of a motion sensor, a vibration sensor, or a sound detector. The motion sensor may be of any type and may measure one or more of acceleration, velocity or orientation, in absolute terms or in one or more directions. The motion sensor may include one or more of an inertial measurement unit (IMU), an accelerometer with any number of axes, a gyroscope, a magnetometer, etc. The vibration sensor may be of any type and may measure mechanical vibrations experienced by PED 10, in one or more frequency ranges. In some embodiments, the vibration sensor is tailored to detect mechanical vibrations generated by an airplane, for example during takeoff, inflight or landing. Both the motion sensor and the vibration sensor may be seen to measure different types of own motion of the PED 10. The sound detector may be of any type and may measure the magnitude of sound waves inside or in the surroundings of the PED 10, in one or more frequency ranges. In some embodiments, the sound detector is tailored to detect sound that is typical to an operating airplane, for example during takeoff, inflight or landing.

The method 300 further presumes that the PED 10 comprises a first model, which is configured to operate on first sensing data from the first module to detect a first set of AFEs, and a second model, which is configured to operate on second sensing data from the second module to detect a second set of AFEs. As understood from the above, the first sensing data may comprise parameter values indicative of ambient pressure at the PED 10, and the second sensing data may comprise parameter values indicative of own motion of the PED 10 or ambient sound at the PED 10. The rationale for the example method 300 is that ambient pressure has been found to enable simple and robust detection of AFEs such as takeoff and landing, as will be exemplified further below, whereas the use of own motion or ambient sound has been found to require much more sophisticated analysis for detection of similar AFEs. It may be noted that the first and second sets of AFEs need not be identical, but that there should be a correspondence between at least one AFE in each of the first and second sets of AFEs, where the at least one AFE indicates that the PDE 10 is located in an airplane in or preparing for movement. In the following examples, it is assumed that both of the first and second sets of AFEs comprise at least an AFE representative of takeoff, and an AFE representative of landing.

The method 300 comprises steps 301-305, which are performed repeatedly. Steps 301-302 obtain first sensing data, S1, based on output of the first sensing module, and second sensing data, S2, based on output of the second sensing module. Steps 301, 302 comprises receiving or retrieving output data of the respective sensing module. Optionally, steps 301, 302 may further process this output data for generation of S1 and S2, respectively. In the following examples, it is assumed that steps 301, 302 result in a respective time sequence of data samples within a time window, where each data sample is associated with a time step within the time window and where the time steps may differ between the time sequences. As understood from the above, the respective data sample in S1 is a parameter value indicative of ambient pressure, and the respective data sample in S2 is a parameter value indicative of own motion or ambient sound. It may be noted that S1 or S2 may include more than one data sample (parameter value) for each time step. In some embodiments, S1 may include parameter values designating one or more of absolute pressure, a change in absolute pressure in relation to a preceding time step, a variability in pressure during the time window or part thereof, etc. In some embodiments, S2 may include parameter values designating one or more of acceleration, velocity, orientation, sound intensity in one or more frequency ranges, vibration intensity in one or more frequency ranges, one or more statistical metrics (mean, standard deviation, RMS, etc.) for acceleration, velocity, orientation, sound intensity, or vibration intensity within the time window or part thereof.

Step 303 generates first event data, E1, by operating a first model on S1. Correspondingly, step 304 generates second event data, E2, by operating a second model on S2. The first event data may be generated as a time sequence of indicators representing predefined first events that are detectable by the first model, and the second event data may be generated as a time sequence of indicators representing predefined second events that are detectable by the second model. Thus, the respective first event may be an AFE among the first set of AFEs, or another event that is not an AFE. Correspondingly, the respective second event may be an AFE among the second set of AFEs, or another event that is not an AFE. Events that are not AFEs may, for example, indicate that the PDE 10 is stationary, is located on ground level, is moving on ground level, is located on a ship, truck, train, etc. It is conceivable that a respective default event may be defined for the first and second models, and that the default event is not represented by an indicator but is rather inferred from the absence of an indicator.

Step 305 controls the PED 10 based on E1 and/or E2 generated for the time window, for example by selectively activating a flight mode of the PED 10. In some embodiments, step 305 activates the flight mode when E1 and/or E2 are deemed indicative of an airplane in or preparing for movement. Such embodiments may ensure that the flight mode is activated whenever there is a risk that RF signals generated by the PED 10 may interfere with the operation of the airplane. In some embodiments, step 305 activates the flight mode when E1 and/or E2 are deemed indicative of takeoff, inflight or landing of an airplane. Such embodiments may ensure that the flight mode is activated at specific phases that may be particularly vulnerable to RF interference. Step 305 may also control the deactivation of the flight mode based on E1 and/or E2.

It may be noted that the term "deemed indicative" above infers that step 305 may perform an assessment of the likelihood that the indications by E1 and/or E2 are correct, for example based on the stability of the indications in E1 and/or E2 within the time window or over a sequence of time windows.

In one specific example, to comply with the above-mentioned EASA regulations for cargo-tracking devices, step 305 may activate the flight mode whenever at least one of E1 and E2 is deemed to indicate takeoff of an airplane, and then keep the flight mode activated until both E1 and E2 are deemed to indicate that the airplane has landed, whereupon step 305 deactivates the flight mode.

As shown in FIG. 3, the method 300 further comprises step 306 which may be performed for every n:th repetition of steps 301-305, with n≥1. Step 306 generates training data, TD, that comprises groups of time-aligned data samples in E1 and S2. As noted above, there may be more than one data sample in S2 for each time step. In some embodiments, step 306 generates each group to include a respective set of data samples (parameter values) from S2, and a respective data sample (first event) from E1. Each such group of time-aligned data samples may be seen as an annotation/labeling of the set of data samples from S2 by a data sample from E2. In other words, by trusting the output of the first model, the method 300 is capable of annotating at least a subset of the data samples in S2, automatically and without human intervention. In some embodiments, the respective group in the training data comprises a feature vector, which contains the set of data samples (parameter values) from S2, and a label, which is given by the data sample (first event) from E1.

As understood from the foregoing, the data samples in E1 need not coincide with the data samples in S2. In some embodiments, step 306 performs a time-alignment procedure to include, in the groups, data samples from E1 and S2 that are deemed to be concurrent. Data samples may be deemed to be concurrent based on time stamps associated with the data samples. In one example, data samples in E1 and S2 form a group if their time stamps differ by less than a predefined time ("limit time difference"). The limit time difference may be set to ensure causality between the data samples in E1 and S2 and may be determined analytically or by experimentation. The limit time difference may depend on the type of control, the type of AFE(s) to be detected, the type of sensor data, etc. For example, the limit time difference may be on the order of milliseconds, seconds or minutes.

The method further comprises steps 307 and 308 which may be performed for every m:th repetition of steps 301-305, with m≥n. The execution of steps 307-308 may be triggered by any means. In one example, step 307 and 308 may be performed any time between flights, when the PED 10 arrives at certain location, or when the PED 10 receives a dedicated command, for example via a control interface on the PED 10. Step 307 generates an updated second model by use of the training data, and step 308 replaces the second model, which is used by step 304, by the updated second model. Thereby, the method 300 enables the control of the PED 10 by steps 301-305 to be improved during use of the PED 10.

As noted above, the method 300 may be particularly suited when the first model is more readily adaptable to detect AFEs than the second model. Generally, it is easier to detect AFEs based on ambient pressure compared to own motion or ambient sound, since the latter may vary significantly also when the PED is not located on an airplane, whereas the ambient pressure remains relatively stable outside an airplane. For example, for airplanes that comprises a pressurization system that controls the ambient pressure in the cabin/luggage compartment, takeoff and landing may be inferred from a characteristic change in ambient pressure measured by the PED 10 as the pressurization system operates to compensate for the pressure change caused by the ascent or descent of the airplane. If the PED 10 is located in a non-pressurized space, the takeoff and landing may be inferred from another type of characteristic change in ambient pressure. In some embodiments, the first model is a rule-based model. Such a first model may be well-suited to detect AFEs with high reliability based on parameter values indicative of ambient pressure. In some embodiments, the first model may be configured to generate E1 (step 303) based on an evaluation of S1 in relation to one or more threshold values.

On the other hand, the second model may be a more complex model, given the more complex nature of the second sensing data, S2. In some embodiments, the second model is a data-driven model, for example a machine learning-based model such as an artificial neural network, a decision tree, a support vector machine, regression analysis, a Bayesian network, a genetic algorithm, etc. In the non-limiting example of S2 comprising accelerometer data, it is realized that a simple rule-based model may be insufficient to distinguish between AFEs and impact of road bumps during road transport, ship movement during water transport, uphill or downhill movement during road transport, etc.

Figure 4A:
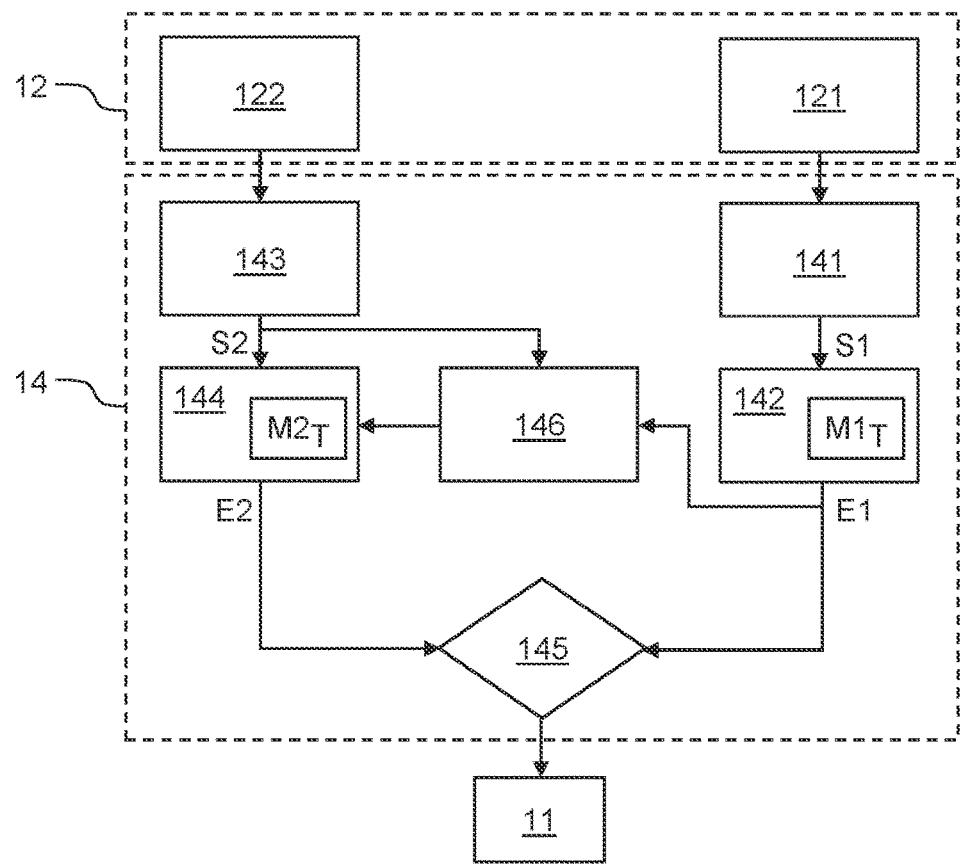
FIGS. 4A-4C are functional block diagrams of an example systems and sub-systems in the portable electronic device of FIG. 2.

Further embodiments of the method 300 will be described in the context of the example PED 10 in FIG. 2 with reference to functional block diagrams in FIGS. 4A-4C. In the illustrated example, the sensing system 12 comprises a first sub-system ("first module") 121 which includes or is connected to one or more sensors for sensing ambient pressure, and a second sub-system ("second module") 122 which includes or is connected to one or more sensors for sensing own motion and/or ambient sound. The event detection system 14 comprises a first detection sub-system formed by a first provider module 141, which implements step 301 in FIG. 3 to output the first sensing data, S1, and a first event generation module 142, which implements step 303 in FIG. 3 to output the first event data, E1. As indicated, module 142 comprises the first model $M1_T$, where subscript T indicates that the first model has been trained or otherwise adapted to perform the task of detecting AFEs, for example by having appropriate threshold values, appropriate rules, etc. The event detection system 14 further comprises a second detection sub-system formed by a second provider module 143, which implements step 302 in FIG. 3 to output the second sensing data, S2, and a second event generation module 144, which implements step 304 in FIG. 3 to output the second event data, E2. As indicated, module 144 comprises the second model $M2_T$, where subscript T indicates that the second model has been trained or otherwise adapted to perform the task of detecting AFEs. FIG. 5A shows an example of S1 and S2, where each vertical line represents one or more data samples (parameter values), and corresponding E1 and E2, where each vertical line represents an event generated in response to S1 and S2. In the example of FIG. 5A, there is correspondence between first and second events in E1 and E2. According to FIG. 4A, the event detection system 14 further comprises an evaluation module 145, which implements part of step 305 and is configured to evaluate corresponding events in E1 and E2 in relation to decision criteria for the operation of the PED 10. Subject the outcome of the evaluation, module 145 may generate a signal for the controller 11 to activate or deactivate the flight mode. Module 145 may alternatively be implemented by the controller 11.

The event detection system 14 further comprises an updating module 146, which implements steps 306-308 in FIG. 3 and operates on E1 from the first detection sub-system and S2 from the second detection sub-system to update the second model $M2_T$.

Figure 4B:
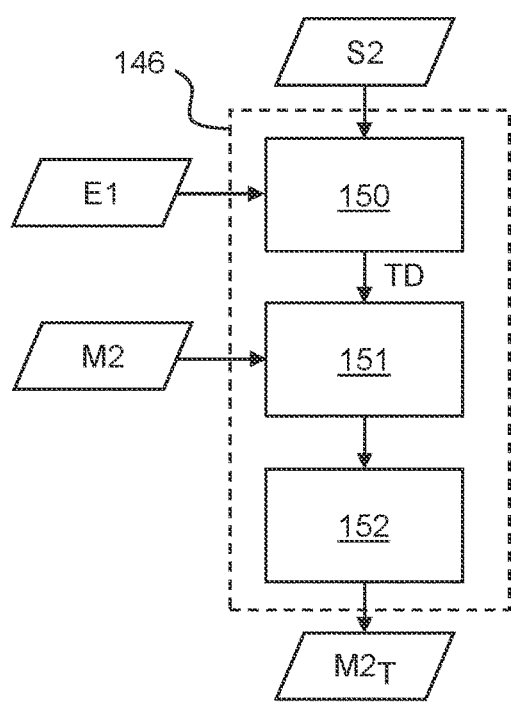
Figure 5A:
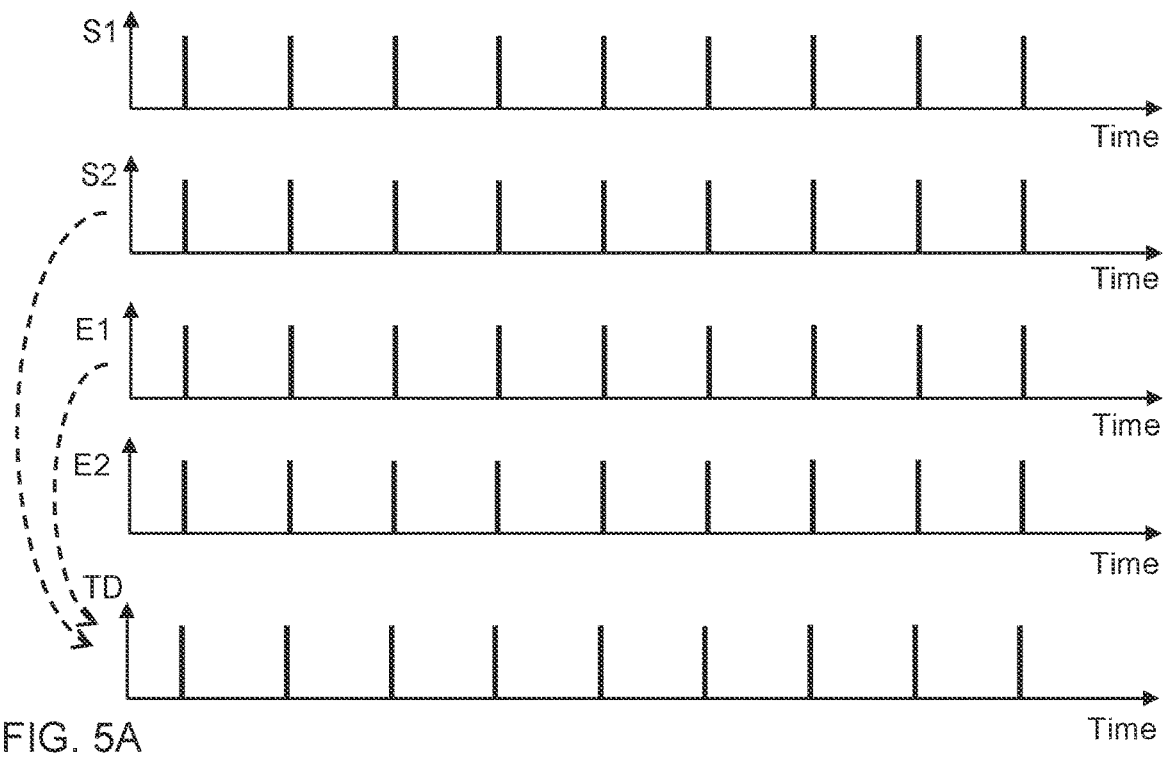
FIGS. 5A-5B show time sequences of various data samples that are generated and processed in example embodiments.

FIG. 4B is a functional block diagram of the updating module 146 in accordance with an embodiment. The module 146 comprises an alignment sub-module 150, which implements step 306 to receive E1 and S2 and generate groups of time-aligned data samples from E1 and S2. These groups form training data, TD, which is output by sub-module 150 for processing by a training sub-module 151, which implements step 307 in FIG. 3. The training data TD is schematically illustrated in FIG. 5A, where each vertical line represents a respective group, and the dashed arrows indicate that the groups are formed by combining time-aligned data samples from E1 and S2.

FIG. 5A is a simplified example. It is conceivable that data samples in E1 and S2 are generated at different rates, so that only a subset of the data samples in E1 and S2 are time-aligned with each other. It is also conceivable that data samples are missing for certain time steps in E1 and/or S2. Further, there may be a fixed or variable time shift between data samples in E1 and S2, which needs to be accounted for, for example by use of the above-mentioned limit time difference.

The alignment sub-module 150 may provide TD in real time to sub-module 151 or store TD in a memory for subsequent retrieval by sub-module 151. The training sub-module 151 performs a training procedure that operates a selected model on TD from sub-module 150. The selected model may be an untrained model or a trained model. In some embodiments, the underlying untrained model of $M2_T$ is re-trained, as indicated by input of M2 in FIG. 4B. In other embodiments, the trained model $M2_T$ used by module 144 (FIG. 4A) is trained by so-called fine tuning. As understood by the skilled person, fine tuning is a process of taking values of learnable parameters of a trained model and using them as initialization values for re-training of the model on new data. During the re-training, some of the learnable parameters from the trained model may be fixed ("frozen"). In the context of machine learning-based models, the fixed parameters may include one or more weights and/or biases of nodes in one or more layers of the model. A replacement sub-module 152 implements step 308 and is configured to replace the trained second model to be used by module 144 (FIG. 4A). In this context, the trained second model may be replaced in full, for example by replacing firmware that implements the module 144, or by updating or changing individual parameter values or parameters of $M2_T$ in module 144.

Figure 4C:
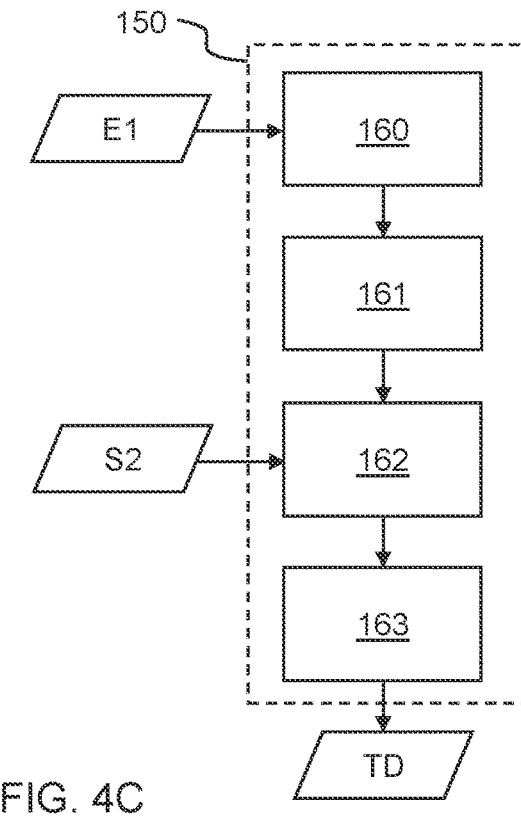

FIG. 4C is a functional block diagram of the alignment sub-module 150 in accordance with an embodiment. A first input sub-module 160 is configured to retrieve or receive first events of E1. A filtering sub-module 161 is configured to perform a filtering operation by removing first events that are deemed unreliable, to thereby generate filtered first event data, denoted $E1_F$. Such a filtering operation may serve to significantly improve the accuracy of the training data TD. In some embodiments, the filtering operation is based on a position associated with the respective first event. The position may be indicative of the geographic location of the PED 10 when the first event was generated and may be provided by a position sensor in the PED 10, for example a GNSS receiver. The rationale for the position-based filtering is that the detection of AFEs based on ambient pressure may be unreliable at geographic sites at high (or low) altitudes, for example in mountain regions. Thus, the PED 10 may store a database of unreliable regions, for example in the form of one or more geofences, and the sub-module 161 may selectively remove first events that are associated with a position that falls within one of the unreliable regions. In some embodiments, the filtering operation is based on a reliability score for the respective first event. Such a reliability score may be produced by module 142 when generating E1. The reliability score may be given at any resolution and may be determined by use of a dedicated set of rules in the first model, for example by comparing one or more parameter values in S1 to one or more threshold values. Accordingly, sub-module 161 may selectively remove first events that are associated with low reliability scores.

Figure 5B:
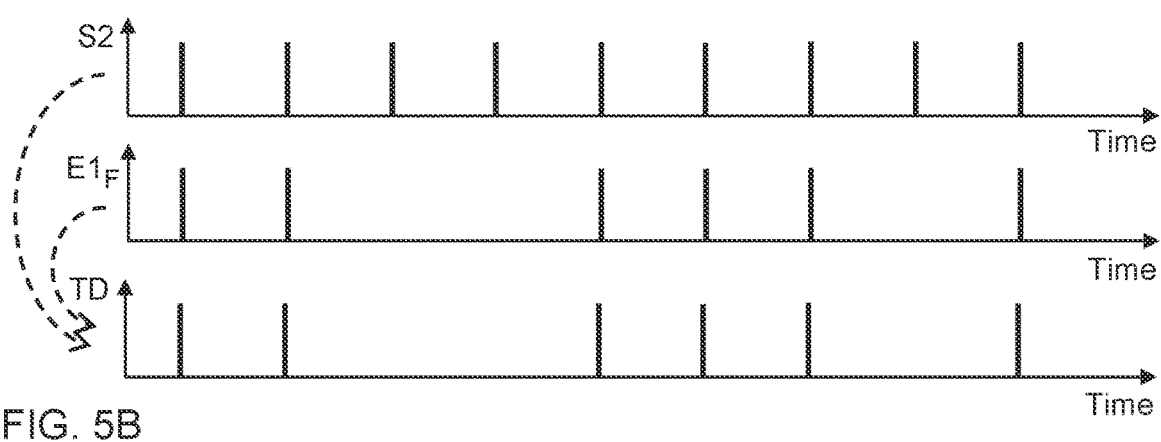

A second input sub-module 162 is configured to retrieve or receive data samples of S2. A grouping sub-module 163 is confirmed to perform the above-mentioned time-alignment to form groups of data samples between $E1_F$ and S2. Examples of $E1_F$ and S2 are shown in FIG. 5B. As seen, the filtering operation has removed first events at some time steps, resulting in gaps in the time sequence of first events in $E1_F$. As indicated by dashed arrows, TD is formed by combining time-aligned data samples from $E1_F$ and S2.

Alternatively or additionally, the filtering sub-module 161 may be configured to selectively remove data samples in S2, based on any suitable reliability criterion, and the grouping sub-module 162 may operate on the thus-filtered S2.

In a further alternative, the filtering operation may be performed on TD, by selectively removing groups containing data samples (first events/parameter values) that are deemed unreliable.

It may also be noted that step 305 (FIG. 3), and thus evaluation module 145 (FIG. 4A), may operate on $E1_F$ instead of E1.

Figure 6:
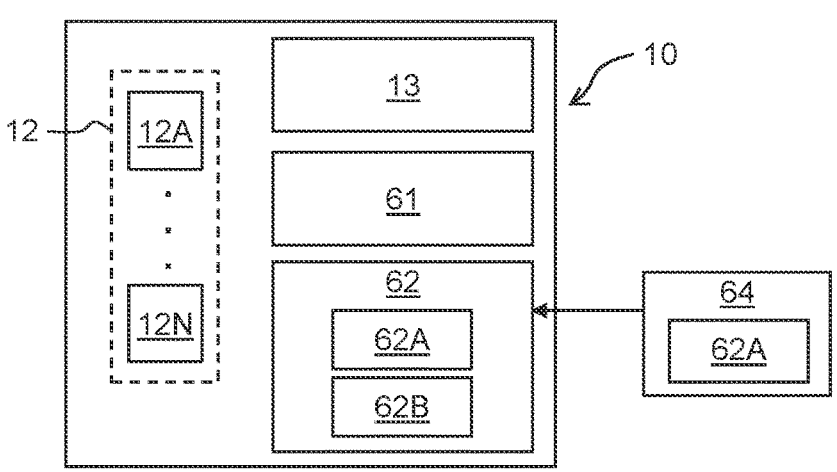
FIG. 6 is a block diagram of a machine that may implement any one of the methods, procedures and functions described herein.

The structures and methods disclosed herein may be implemented by hardware or a combination of software and hardware. In some embodiments, the hardware comprises one or more software-controlled processors. FIG. 6 schematically depicts a PED 10, which comprises a sensor system 12 that includes sensors designated by 12A-12N. At least a subset of the sensors 12A-12N may be included in or connected to the modules 121, 122 in FIG. 4A. The PED 10 further comprises a processing system 61, computer memory 62, and a wireless communication system 13, for example as described for FIG. 2. The processing system 61 may include one or more of a CPU ("Central Processing Unit"), a DSP ("Digital Signal Processor"), a GPU ("Graphics Processing Unit"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 62A comprising computer instructions is stored in the memory 62 and executed by the processing system 61 to implement logic that performs any of the methods, procedures, functions, operations, or steps described in the foregoing. The control program 62A may be supplied to the PED 10 on a computer-readable medium 64, which may be a tangible (non-transitory) product (e.g. magnetic medium, optical disk, read-only memory, flash memory, etc.) or a propagating signal. As indicated in FIG. 6, the memory 62 may also store control data 62B for use by the processing system 61, such as definition data for $M1_T$, $M2_T$ or M2, the limit time difference, etc.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

For example, the present disclosure is not limited to controlling activation and deactivation of a flight mode. The methods and structures described hereinabove are equally applicable to other types of control of a PED based on E1 and/or E2, for example to activate different power-consumption modes, to activate/deactivate data logging in the PED, to change the type or amount of data that is generated, stored, or transmitted by the PED, etc.

Further, while operations are depicted in the drawings in a particular order, this should not be understood as requiring that such operations be performed in the particular order shown or in sequential order, or that all illustrated operations be performed, to achieve desirable results.

In the following, clauses are recited to summarize some aspects and embodiments as disclosed in the foregoing.

C1. A method of controlling a portable electronic device (10) comprising a first module (121) for sensing ambient pressure, and a second module (122) for sensing own motion or ambient sound, the method comprising the steps of:

obtaining (301) first sensing data based on output from the first module (121);

obtaining (302) second sensing data based on output from the second module (122);

generating (303) first event data by operating, on the first sensing data, a first model configured to detect a first set of airplane flight events;

generating (304) second event data by operating, on the second sensing data, a second model configured to detect a second set of airplane flight events; and controlling (305) the portable electronic device (10) based on the first event data and/or the second event data;

said method further comprising: generating (306) training data comprising groups of time-aligned data samples from the first event data and the second sensing data;

generating (307) an updated second model by use of the training data; and replacing (308) the second model by the updated second model.

C2. The method of C1, wherein the first module (121) comprises or is connected to a pressure sensor.

C3. The method of C1 or C2, wherein the second module (122) comprises or is connected to one or more of a motion sensor, a vibration sensor, or a sound detector.

C4. The method of any preceding clause, wherein the first sensing data comprises parameter values indicative of ambient pressure at the portable electronic device (10).

C5. The method of any preceding clause, wherein the second sensing data comprises parameter values indicative of own motion of the portable electronic device (10) or ambient sound at the portable electronic device (10).

C6. The method of any preceding clause, wherein the first model is configured to detect the first set of airplane flight events based on an evaluation of the first sensing data in relation to one or more threshold values.

C7. The method of any preceding clause, wherein the first model is a rule-based model.

C8. The method of any preceding clause, wherein the second model is a data-driven model.

C9. The method of any preceding clause, wherein said generating (306) training data comprises: generating each of the groups to include a respective set of data samples in the second sensing data, and a respective data sample in the first event data.

C10. The method of C9, wherein the respective set of data samples in the second sensing data is deemed to be concurrent with the respective data sample in the first event data.

C11. The method of C9 or C10, wherein the respective set of data samples in the second sensing data defines a feature vector.

C12. The method of C11, wherein the respective data sample in the first event data defines a label of the feature vector.

C13. The method of any preceding clause, wherein the training data is generated to exclude (161) data samples in the first event data that are deemed unreliable.

C14. The method of C13, wherein the data samples in the first event data are deemed unreliable based on at least one of: a reliability score generated by the first model for each data sample in the first event data, or a position associated with each data sample in the first event data by the portable electronic device (10).

C15. The method of any preceding clause, wherein said generating (307) an updated second model comprises performing a training procedure (151) that operates a selected model on the training data.

C16. The method of any preceding clause, wherein said controlling (305) comprises: selectively activating a flight mode of the portable electronic device (10).

C17. The method of C16, wherein the flight mode is activated when the first event data and/or the second event data are deemed indicative of an airplane (1) in or preparing for movement.

C18. The method of C16 or C17, wherein the flight mode is activated when the first event data and/or the second event data are deemed indicative of takeoff, inflight or landing of an airplane (1).

C19. The method of C17 or C18, wherein each of the first and second sets of airplane flight events comprises at least one airplane flight event which is indicative of the airplane (1) in or preparing for movement.

C20. The method of any one of C16-C19, wherein the portable electronic device (10) is configured with a radio-frequency signal transmission capability, and wherein said selectively activating the flight mode comprises disabling the radio-frequency signal transmission capability.

C21. A computer-readable medium comprising instructions which, when installed on a processing system (61), causes the processing system (61) to perform the method of any one of C1-C20.

C22. A portable electronic device comprising a first module (121) for sensing ambient pressure, and a second module (122) for sensing own motion or ambient sound, the portable electronic device further comprising logic (61, 62A) configured to perform the method of any one of C1-C20.

What is claimed is:

1. A method of controlling a portable electronic device comprising a first module for sensing ambient pressure, and a second module for sensing own motion or ambient sound, the method comprising the steps of:

obtaining first sensing data based on output from the first module;

obtaining second sensing data based on output from the second module;

generating first event data by operating, on the first sensing data, a first model configured to detect a first set of airplane flight events;

generating second event data by operating, on the second sensing data, a second model configured to detect a second set of airplane flight events; and controlling the portable electronic device based on the first event data and/or the second event data;

said method further comprising: generating training data comprising groups of time-aligned data samples from the first event data and the second sensing data; generating an updated second model by use of the training data; and replacing the second model by the updated second model.

2. The method of claim 1, wherein the first module comprises or is connected to a pressure sensor.

3. The method of claim 1, wherein the second module comprises or is connected to one or more of a motion sensor, a vibration sensor, or a sound detector.

4. The method of claim 1, wherein the first model is a rule-based model.

5. The method of claim 1, wherein the second model is a data-driven model.

6. The method of claim 1, wherein said generating training data comprises: generating each of the groups to include a respective set of data samples in the second sensing data, and a respective data sample in the first event data.

7. The method of claim 6, wherein the respective set of data samples in the second sensing data is deemed to be concurrent with the respective data sample in the first event data.

8. The method of claim 1, wherein the training data is generated to exclude data samples in the first event data that are deemed unreliable.

9. The method of claim 8, wherein the data samples in the first event data are deemed unreliable based on at least one of: a reliability score generated by the first model for each data sample in the first event data, or a position associated with each data sample in the first event data by the portable electronic device.

10. The method of claim 1, wherein said controlling comprises: selectively activating a flight mode of the portable electronic device.

\* \* \* \* \*